United States Patent [19]

Sullivan

[11] 4,150,200
[45] Apr. 17, 1979

[54] FLAT BATTERY WITH NOVEL SLURRY FORM ELECTRODE

[75] Inventor: Charles I. Sullivan, Melrose, Mass.

[73] Assignee: Polaroid Corporation, Cambridge, Mass.

[21] Appl. No.: 532,906

[22] Filed: Dec. 16, 1974

[51] Int. Cl.² .................................................. H01M 6/46
[52] U.S. Cl. ........................................ 429/152; 429/162
[58] Field of Search ................ 136/83 R, 111, 107, 136/175; 429/152, 162, 201, 224

[56] References Cited

U.S. PATENT DOCUMENTS

| 2,960,558 | 11/1960 | Maisal et al. | 136/107 |
| 3,069,485 | 12/1962 | Winger et al. | 136/107 X |
| 3,228,801 | 1/1966 | Snyder | 136/107 X |
| 3,335,031 | 8/1967 | Kordesch | 136/107 X |
| 3,694,266 | 9/1972 | Bergum et al. | 136/111 |
| 3,697,328 | 10/1972 | Bilhorn | 136/111 X |
| 3,706,616 | 12/1972 | Bergum et al. | 136/111 X |
| 3,708,349 | 1/1973 | Macaulay et al. | 136/111 X |
| 3,723,181 | 3/1973 | Oakley | 136/111 X |
| 3,770,504 | 11/1973 | Bergum | 136/111 X |
| 3,784,414 | 1/1974 | Macaulay et al. | 136/111 X |

*Primary Examiner*—Charles F. Lefevour
*Attorney, Agent, or Firm*—John W. Ericson; Gerald L. Smith; Stanley H. Mervis

[57] ABSTRACT

A planar primary battery particularly suited for photographic application characterized in exhibiting high current drain capacities and improved manufacturability. The battery structure incorporates at least one electrode present in aqueous slurry form as a particulate dispersion of active material and poly(2-acrylamido-2-methylpropanesulfonic acid) in combination with electrolyte.

3 Claims, 8 Drawing Figures

FLAT BATTERY WITH NOVEL SLURRY FORM ELECTRODE

BACKGROUND OF THE INVENTION

This invention relates to electrical energy power supplies and, more particularly, to battery power supplies of flat configuration.

Batteries formed having a flat, multicell configuration have been recognized as having considerable utility as a power source for advanced consumer and industrial products. For instance, when effciently designed and fabricated, the power sources may exhibit a relatively low internal impedance as well as a relatively high current output capacity. These desirable powering characteristics, when coupled with a generally flat geometric configuration, ideally lend such power supplies to a use in complement with compact but sophisticated electronically controlled instruments and devices.

As an example of such a union of components, flat primary batteries have been combined with the photographic film packs employed exclusively in a photographic camera sold by Polaroid Corporation of Cambridge, Massachusetts, U.S.A., under the trademark "SX-70". Described, for instance, in U.S. Pat. Nos. 3,705,542; 3,543,662; 3,543,663; and 3,595,661, the film packs are formed comprising a disposable cassette structure containing a dark slide for covering an exposure station in a forward wall thereof, a stack of individual "self-developing" film units positioned behind the dark slide, a spring platen for urging the film units toward the forward wall to position the uppermost one of the film units in the stack at the exposure station and a flat battery positioned opposite to the platen having adjacent terminal surfaces of opposed polarity which are accessible from the rearward wall of the cassette. Thus configured, the film pack is ideally suited as a component within a photographic system incorporating a highly automated camera of complementing compact configuration. Such a camera may include integrated solid state control circuits as detaled in U.S. Pat. No. 3,774,516 which serve a myriad of functions including the control of tractive electromagnetic drives as described, inter alia, in U.S. Pat. Nos. 3,791,278; 3,750,543; 3,805,204; and 3,820,128. Additionally, the power supply provided the camera permits a utilization of dynamo electric motor drives and the like as disclosed, for instance, in U.S. Pat. Nos. 3,811,081 and 3,731,608.

For practical utilization, the flat battery structures should be capable of exhibiting efficient performance characteristics without the external application of compressive forces. Alternatives to otherwise necessary compression deriving techniques generally have looked to the incorporation of adhesives, particularly between particulate active electrode materials and current collector surfaces. For instance, in U.S. Pat. No. 3,770,504 particulate electrode material for association with a carbon impregnated polymer current collector surface is provided with adhesives which generally are insulative in character. The resultant "patch-type" electrode structures typically are preformed upon the collector surfaces prior to battery manufacture. These assemblies subsequently are combined in combination with gel electrolyte material and the like to form laminar pile or battery assemblies in continuous web fashion. Desired ashesion of the electrode materials with the collector surfaces, while providing necessary association therebetween, tends to derogate the efficiency therof inasmuch as chemical activity of the battery necessarily is hindered or blocked by the adhesive lattice within which the electrode particles are embedded.

A flat battery structure from which considerably enhanced current drain capacities are available is described in copending application of S. A. Buckler, Ser. No. 495,681, filed Aug. 8, 1974, entitled "Flat Battery" now abandoned and assigned in common herewith. This battery includes both positive and negative active components in an aqueous slurry form as particulate dispersions with electrolyte and a hydrophilic binder or dispersant. The electrode particles within the slurry are present in a concentration per unit area which is effective to provide an electrically conductive dispersion and, in consequence of the higher surface availability of electrode materials within the electro-chemical system, battiers of a desirably broad range of current capacities are readily designed and manufactured. For instance, one such manufacturing technique, described in copending U.S. application for U.S. patent by O. E. Wolff, Ser. No. 514458, filed Oct. 15, 1974 and entitled "Method for Forming A Slurry Battery Cell," also assigned in common herewith, describes that the slurry battery structures may be formed in situ as a step in fabrication of a laminar pile assembly.

In a copending application for U.S. Pat., Ser. No. 495,628, filed Aug. 8, 1974, by E. H. Land, entitled "Flat Battery" now abandoned and assigned in common herewith, another flat battery structure of enhanced output capacity is described as incorporating a laminar cellular structure incorporating a planar cathode assembly including a current collector carrying on one surface, in order, a first cathode mix comprising a particulate dispersion of cathode mix particles in a binder matrix and a second cathode mix comprising a particulate dispersion of cathode mix particles with hydrophilic binder disposed within aqueous electrolyte, i.e., in slurry form. In this hybrid form of slurry electrode structure, a highly desired improved shelf life characteristic is evidenced in combination with the noted advantageous higher output capacity.

As may be evidenced from the foregoing, highly desirable in the flat battery field is a structure which enjoys the considerably enhanced fabricability ahd output capacity of a slurry type electrode system as well as evidences an enhanced interaction between active electrode material and associated collector surface. Where such association is available, improved as well as adjustable output capacity and fabricability characteristics are realized.

SUMMARY

The present invention is addressed to a flat battery structure of improved reliability, capacity and current density. This structure further is characterized in having a configuration lending itself to more efficient manufacturing procedures. These advantageous features are realized through a particular battery formation wherein either or both positive and negative active components are present therewithin in aqueous slurry form as a particulate dispersion with electrolyte and poly(2-acrylamido-2-methylpropanesulfonic acid) as a specialized dispersing agent and wet binder. Through the use of slurry electrode structures varying current capacity requirements are readily accommodated for during manufacture by the expedient of altering the electrode active material quantities. Appropriate planar current collector structures in association with a border sealing arrangement assure the integrity of the completed battery structure.

Manufacturing requirements for providing battery structures according to the invention further are improved inasmuch as at least certain of those procedures otherwise required for preforming electrode materials, for instance, providing "dry patch" depositions upon conductive sheet polymeric collector structures, as by predepositing a dispersion of particulate active material and subsequently removing the liquid phase thereof, are dispensed with. These improvements in eliminating certain steps of manufacture while simplifying others tends to render higher volume manufacturing techniques more efficient, resulting in advantageously lowered unit costs.

Another feature and object of the invention is to provide a planar battery of a variety having at least one cell including positive and negative electrodes and an electrolyte ion permeable separator arrangement located therebetween. A planar current collector is provided at the electrodes having a surface for association with active electrode material. The electrode material comprises an aqueous slurry of active material particles and poly(2-acrylamido-2-methylpropanesulfonic acid) as a binder-dispersant in uniform distribution with aqueous electrolyte. The active material particles are present in a concentration in per unit area which is effective to provide an electrically conductive dispersion and the dispersant-binder is present in a concentration per unit area effective both to provide the conductivity of the dispersion as well as to disperse and bend the wet active mass. The electrolyte component is present in intimate surface contact with the active material particles in a concentration effective to provide an ionically conductive dispersion. In a preferred embodiment, the active material particles are manganese dioxide and carbon and, when combined with the noted dispersing agent, an electrode arrangement is provided having high physical stability, resisting syneresis effect, remaining rheologically stable and which is readily prepared for placement within the electrode unit.

In consequence of the higher current density available with the battery structure of the invention, the thinness and compactness of the power supply may be enhanced. For instance, with higher current densities, less active area is required to generate a given power supply characteristic.

The invention accordingly comprises the product possessing the construction, combination of elements and arrangement of parts which are exemplified in the following detailed disclosure.

For a fuller understanding of the nature and objects of the invention, reference should be had to the following detailed description taken in conjunction with the accompanying drawings.

DETAILED DESCRIPTION

Figure 1:
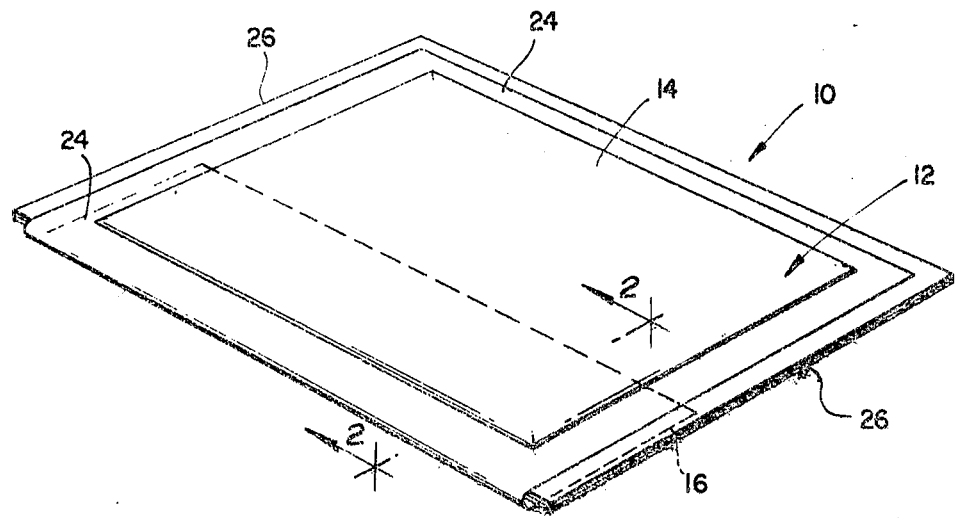
FIG. 1 is a perspective view of a flat primary battery structure according to the invention.

A multicell flat battery structure is presented generally at 10 in FIG. 1 as it would appear in an electrochemically active state following component buildup and prior to final packaging. Features of the battery structure apparent from this perspective view include an upwardly disposed anode current collector assembly 12, the outwardly facing surface 14 of which is fashioned of a metal to serve as a terminal. Current collector assembly 12 is folded about one side of battery structure 10 such that the terminal defining portion 16 of surface 14, as revealed in FIG. 2 and in phantom in FIG. 1, is located on the lower side of the battery. A cathode electrode collector assembly 20 (shown in FIGS. 2 and 3) is provided as the lowermost component of the battery and includes, in similar fashion as assembly 12, a metallic outwardly facing surface portion 22 which also serves as a terminal surface for the battery structure. With the geometry shown, cathode and anode terminals may be provided in convenient adjacency on one side of the pile assembly. The slightly depressed peripheral portion 24 of the assembly is occasioned from peripheral sealing procedures provided during assembly. This depression, as revealed in FIG. 2, necessarily becomes more exaggerated in a sectional view of the battery. Extending from the periphery of the battery and formed in the course of the sealing procedures, is an outer border seal 26 formed of a plurality of frame-type sealing elements which extend inwardly from the border portion shown to select laminar elements of the battery. This lamination, as at 26, is somewhat rigid, thereby enhancing the structural integrity of the flat battery configuration.

Figure 2:
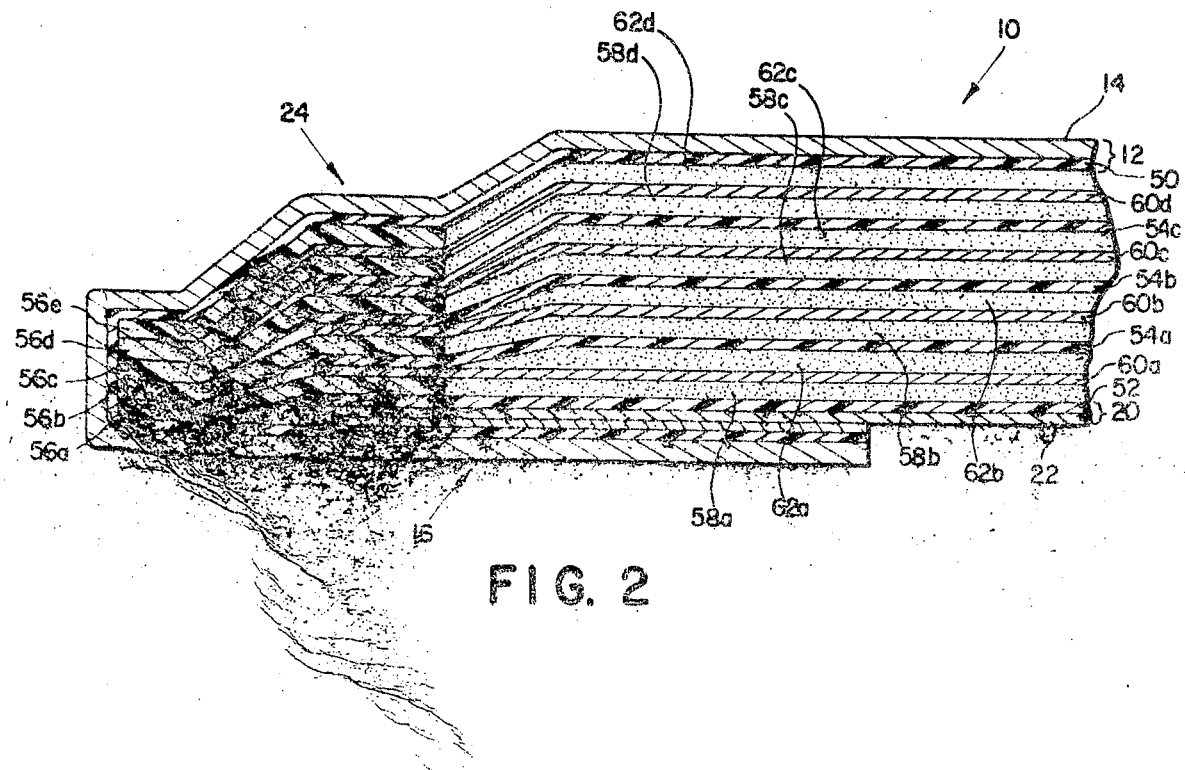
FIG. 2 is a sectional view of a battery structure according to the invention taken through the place 2—2 of FIG. 1.
Figure 3:
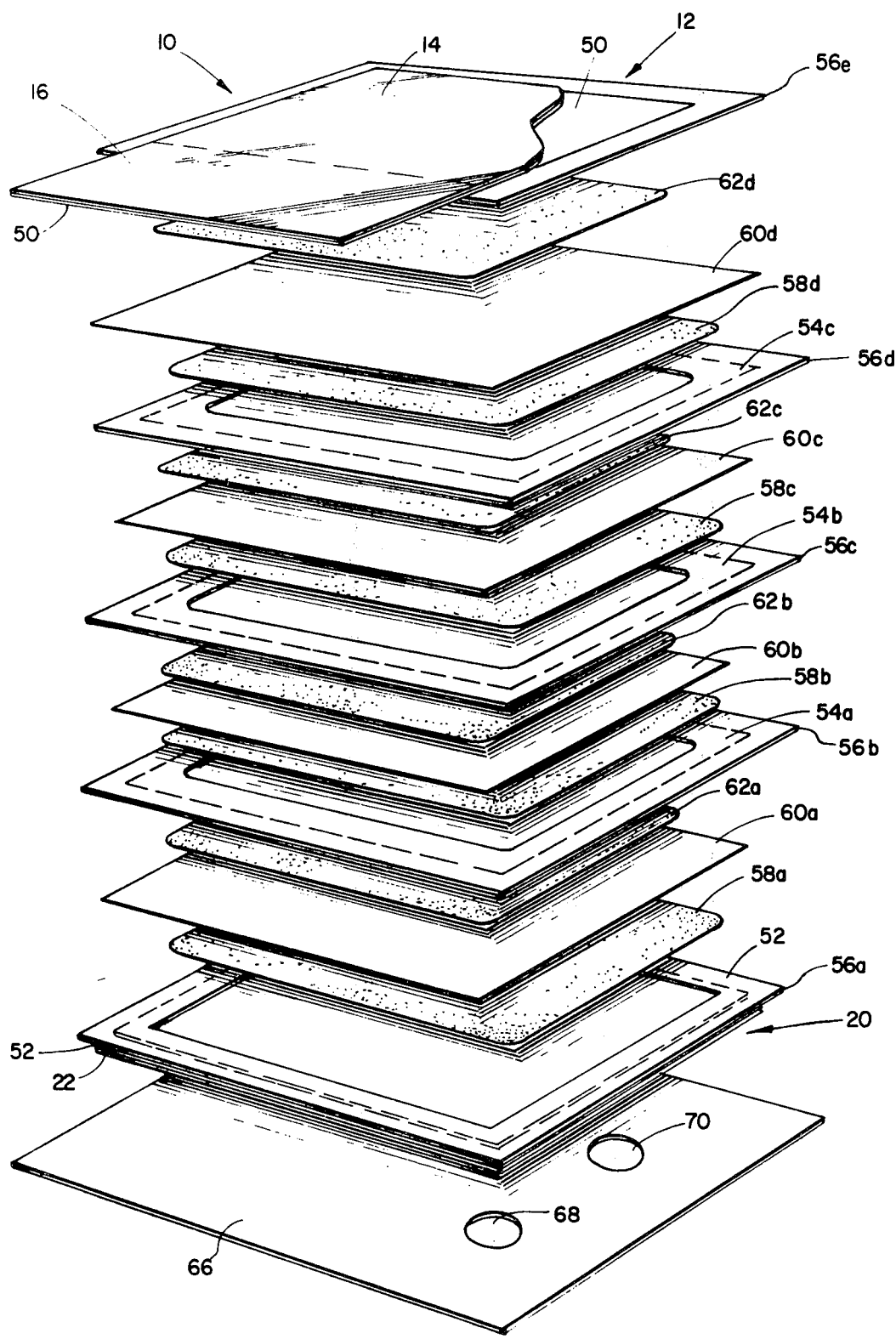
FIG. 3 is an exploded perspective representation of the components of a battery structure according to the invention, revealing the relative orientation of sheet-type components thereof.

Referring to FIGS. 2 and 3, the geometry or interrelationships of the discrete components forming battery pile 10 are revealed in detail. As decribed above, the exposed surfaces of the battery are present as an outer laminate of current collector assemblies 12 and 20. Prefabricated as discrete elements of the system, assemblies 12 and 20 are formed of a metallic sheet foil current collector which, in turn, is laminated to an internally disposed polymeric current collector. In this regard, assembly 12 is formed having a metallic surface current collector 14 serving as a terminal surface laminated with a polymeric current collector 50, while assembly 20 is formed having a metallic current collector outer terminal defining surface 22 laminated with polymeric current collector 52. Each of the metal current collectors 14 and 22 may be provided as an annealed tin coated steel sheet, however, they also may be formed of aluminum or lead sheet material and are preferably on the order of less than 10 mils. in thickness for batteries configured for photographic utilization. Polymeric current collectors 50 and 52 may comprise a non-conductive matrix, for instance, of a thermoplastic material so thoroughly impregnated with conductive particles, as of carbon, for example as to be somewhat unidirectionally conductive. For example, the polymeric layers of the battery may be present as an electrically conductive carbon-impregnated vinyl film sold under the trade designation "Condulon" having a thickness on the order of about 2 mils. for the instant application. As is apparent, the assemblies are prelaminated together prior to their assembly within the battery pile. Collector sheets 50 and 52 generally are impervious to electrolyte, are electrochemically inert and are characterized in exhibiting a low resistance to the flow of current from one face to the opposite face thereof. Accordingly, discrete sheets of this same material may be utilized for geometric cell definition and additionally as intercell connectors within a series build-up of cells forming a primary battery pile structure.

Looking to the build-up of the pile structure, battery 10 is seen to be formed of four serially associated cell units which are electrically associated but chemically isolated by intercell connectors 54a–54c. The intercell connectors preferably are formed as discrete rectangular sheets of electrically conductive carbon-impregnated vinyl film, as described earlier in connection with collector sheets 50 and 52, and, for the instant application, have a thickness on the order of about 2 mils. The peripheral integrity of the entire pile structure is provided by a sequence of frame-shaped border seals designated generally at 56a–56e. Being mutually identically dimensioned, frames 56a–56e are formed having inner borders which define rectangular inner openings which mutually cooperate to form the peripheries of individual cell cavities. Additionally, each of the frames is dimensioned such that it extends beyond the periphery of an associated polymeric intercell connector 54a–54c as well as the polymeric surface portion 52 of assembly 20. As revealed in FIG. 4, the frame 56e extends outwardly from three edges of assembly 20. As is noted from the drawings, frames 56a–56e are continuous and preferably are formed of a material heat sealable both along their commonly juxtaposed surfaces in the final pile structure as well as with polymeric collector sheets 50, 52 and 54a–54c. Material for the frames should be electrolyte impervious, remaining inert to the chemical activity of the battery structure. Preferably, frames 56a–56e are formed of polyvinyl chloride having a thickness, for the present application, of about 5 mils. The thermal sealing of the inner border surface areas to a corresponding polymeric sheet, for instance, as at 52, may be carried out in impulse fashion wherein the temperature of the sealed portion is raised from room temperature to about 275° F. and returned to room temperature over an interval of about 15 seconds.

To form an initial one of the pile cell structures, an initial collector assembly, for instance, cathode collector assembly 20, may be preformed as a discrete assembly and a frame member 56a may be bonded thereto as described above. Over this subassembly is deposited, preferably by extrusion, a positive aqueous slurry which is present as a particulate dispersion of cathodic mix particles uniformly dispersed, preferably in combination with a dispersing agent, with aqueous electrolyte. In the preferred embodiment, the battery 10 incorporates a Le Clanche electrochemical system, accordingly, the cathodic material will be present as a particulate dispersion of manganese dioxide and carbon dispersed within an aqueous electrolyte, including a preferred dispersing agent, an aqueous ammonium chloride, zinc chloride and, where desired, as small amount of mercuric chloride. The noted preferred dispersant for the slurry is one selected to maintain a homogeneous character for the dispersion therewithin and will exhibit a high tolerance for salt as well as a stability from such effects as syneresis or the like. A particularly desirable characteristic for the dispersant is one which renders the slurry thixotropic, thereby considerably facilitating extrusion type deposition procedures and, particularly, a dispersant which possesses an adhesive capacity facilitating the internal bonding of the battery components and thereby reducing internal resistance. In the latter regard, it is desirable that the dispersing agent provide for a particle-to-particle contact of the active particulate material to assure the electrical conductivity of the dispersion. Practical term maintenance of this status requires a physical stability of the dispersion, particularly, its stability as a wet, "sticky" mass. With such physical characteristics, the interfacing surface of an associated current collector will remain "wetted" to provide efficient cell performance. In accordance with the present invention, poly(2-acrylamido-2-methylpropanesulfonic acid) has been discovered to provide all of the noted characteristics when utilized as a dispersing agent. This hydrophylic agent desirably provides for a dispersion of the noted high physical stability; permits formation of a dispersion which is electrically conductive to maintain a proper electrode function; provides appropriate interface association with an associated surface of a current collector; and is susceptible to practical physical treatment during preparation of the dispersion prior to deposition thereof to form an electrode structure. The thixotropic nature of a slurry utilizing the agent considerably contributes to the deposition thereof in the course of high volume manufacture of the batteries. For instance, with such physical characteristic, extrusion techniques and the like may be utilized to apply the particulate material. In the preferred embodiment of the invention, the agent is utilized in forming the cathode electrode of a given primary cell.

The deposited positive aqueous slurries are represented in the drawings at 58a–58d. Note that the slurry as at 58a is deposited over the surface of polymeric collector 52 and corresponding cathodic slurries 58b–58d are located for contact with an upwardly extending surface of an appropriate intercell connector sheet 54a–54c. With the arrangement, the contacting polymeric surface serves as a current collector for the associated positive electrode structure.

It has been determined that for slurry cathode electrode systems according to the invention, the ratio by weight of manganese dioxide to carbon within the slurry may be somewhat optimized. For some structures, improved shelf-life performance may be achieved with manganese dioxide-to-carbon ratios (an acetylene black type carbon being used) between about 6:1 and 12:1. However, within this range, a preferred ratio for achieving improved shelf life for the cells is 8:1. Generally, a solids content for the cathode slurry of about 50 to 70% in combination with the above described dispersing agent has been observed to provide acceptable consistencies for extrusion techniques of deposition.

Upon deposition, as by extrusion, of cathode slurry 58a, a selectively dimensioned sheet of battery separator material 60a is positioned thereover. This material is selected as being wettable by the slurry depositions with which it is in contact as well as being ionically permeable. Additionally, the material should exhibit a texture or porosity, the interstitial openings or channels of which are of adequately fine geometry or size to assure that no migration of the particulate matter of the slurries from one electrode environment to another may occur. Among the materials conventionally used as separators mention may be made of fibers and cellulosic materials, woven or nonwoven fibrous materials such as polyester nylon, polypropylene, polyethylene or glass. Specifically, a Kraft paper having a thickness of about 2.0 mils. has been found to be adequate for the purpose of the instant application. As shown in FIGS. 2 and 3, separator 60a as well as separators 60b–60d are dimensioned as having the same peripheral shape and size as polymeric collector 20 or intercell connectors 54a–54c. In this regard, note that the separators are dimensioned such that their peripheries extend over the inner rectangular openings defined by the inner borders of frames 56a–56e.

For the instant embodiment, the associated anode for the initial cell of the pile structure is represented by a slurry deposited over one surface of intercell connector 54a opposite and generally coextensive with the deposition of cathodic slurry 58a. As in the case of the cathode slurries, the anode slurry as at 62a may be deposited utilizing positive displacement techniques, doctoring, silk screening or the like, however, considerable manufacturing advantage may be achieved inasmuch as the slurry is of a consistency permitting its deposition by extrusion.

Negative electrode slurries 62a–62d comprise a particulate dispersion of metallic anode particles disposed as in the case of the positive slurry, as a substantially uniform dispersion within aqueous electrolyte. For a Le Clanche system, zinc particles are utilized as the active material and are present in a concentration per unit area effective to provide an electrically conductive dispersion thereof, while the electrolyte is present in intimate surface contact with the particles in a concentration rendering the slurry ionically conductive. A zinc particle size of, for example, about eight microns mean diameter may be utilized with the slurry. As in the case of the cathode, the dispersing agent utilized for the slurry may be poly(2-acrylamido-2-methylpropanesulfonic acid). Other agents which may be used with the anode are described, for instance, in the above-noted application for U.S. Pat. Ser. No. 495,681.

The electrolyte utilized with both the positive and negative aqueous slurries of the system ordinarily will comprise a conventional aqueous solution of ammonium chloride/zinc chloride with, particularly in the negative slurry, an addition of a small quantity of mercuric chloride as a corrosion inhibitor.

The first cell build-up is completed with the positioning in registry of intercell connector 54a over negative slurry deposition 62a. Intercell connector 54a is formed, as described above, incorporating a border sealing frame 56b the inner surface portion of which is thermally bonded to the outwardly disposed surface of the intercell connector sheet. Upon being so positioned to define the cell, the outer peripheral border surface portions of frame 56b are thermally bonded with the corresponding outer surface portion of frame 56a. In addition to serving as an intercell connector, sheet 54a also serves as the current collector for the negative electrode of the initial cell. Note that within the initial cell, separator 60a extends not only sufficiently to separate the electrode slurries 58a and 62a but also is configured to provide electrical separation of current collector sheets 52 and 54a and to extend over the thermal bonding surface between each frame member and its associated current collector sheet. With this arrangement, no inadvertent shorting effects or the like are likely to arise. Further, such geometry assures that no migration of the particulate dispersion of one electrode slurry into the opposite electrode slurry occurs.

For production of a battery unit having a single cell construction, cathode slurry material 58a is deposited on current collector assembly 20 as described above. Separator sheet 60a then is positioned over the slurry following which anode slurry material is deposited upon the surface of polymeric current collector 50 of current collector assembly 12. Border frames 56a and 56e then are heat sealed together to complete the cell. This sealing may be carried out by the above-noted impulse thermal bonding technique.

To provide the multicellular pile structure, for instance, having four cells as illustrated in the drawings, the pile build-up is carried out in a sequence suited to the manufacturing technique desired. For instance, in one fabricating technique, the initial cell is fabricated as above by depositing cathode slurry 58a following which separator 60a is positioned over in appropriate registry with polymeric collector 52. Anode slurry material 62a then is deposited upon one surface of intercell connector 54a and the connector 54a as well as previously attached frame 56b is joined with collector assembly 20 and thermally bonded thereto at the adjoining surfaces of frames 56a and 56b. Cathode slurry material as at 58b then is deposited on one side of a next separator sheet 60b and the subassembly is placed in appropriate registry upon the opposite side of polymeric intercell connector 54a. Anode slurry composition then is deposited upon one side of another polymeric intercell connector 54b. Intercell connector 54b, including previously attached frame 56c then is placed over the subassembly including separator 60b following which frame 56c is thermally bonded with frame 56b. This procedure essentially is reiterated until the entire pile structure including anode current collector assembly 12 is attached. Following desired final thermal bonding of the entire stacked array of cells, extended portion 16 of collector assembly 12 is covered with an insulative tape 64 and wrapped around to the underside of the battery to provide for juxtaposed terminal defining surfaces.

Figure 4:
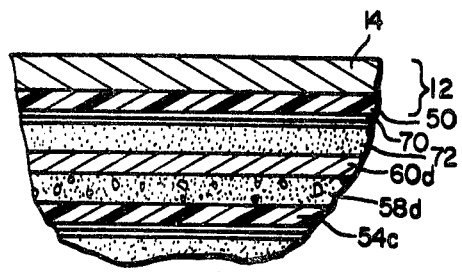
FIGS. 4—8 are partial sectional views of primary batteries having the same general supportive components as those revealed in FIGS. 1 and 2 but having electrochemically active structures representing different embodiments of the invention.

Referring now to FIG. 4, an alternate embodiment for a cell structure which may be utilized to form a multicell battery is revealed. Note that the section looks to the uppermost cell of a pile structure formed including the general supportive or collector and separator components of the battery described in connection with FIGS. 1 and 2. While the structure includes a slurry-type cathode 58c identical to that described in FIGS. 2 and 3, it utilizes an anode structure of conventional components. Described, for instance, in U.S. Pat. No. 3,770,504, the anode active material 70 is of a "dry patch" configuration formed, for instance, by predepositing anode material in the form of powdered zinc dispersed in a binder matrix. Accordingly, the particulate zinc component of the anode is adhesively adhered to an associated polymeric collector surface as at 50. The dry patch anode structure 70 is positioned within the cell structure in combination with a conventional gel electrolyte represented at 72. This electrolyte may utilize the conventional components described earlier, for instance, an aqueous solution of ammonium chloride/zinc chloride about 4:1 dispersed in a polymeric thickener such as hydroxyethylcellulose, for example, on the order of about five percent (5%) or more. In addition, a small quantity of mercuric chloride may be present in the electrolyte as a corrosion inhibitor. The electrolyte may be deposited utilizing conventional positive displacement techniques, doctoring, silk screening or the like.

Figure 5:
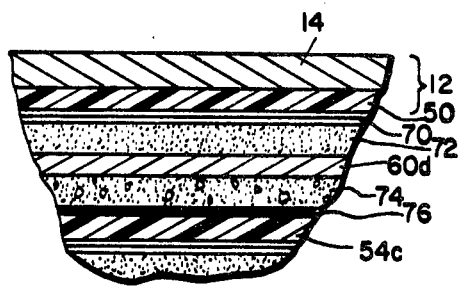

Looking to FIG. 5, still another embodiment of the cell structure of the invention is revealed. In this embodiment, an anode structure including dry patch metallic anode material 70 and electrolyte 72 are present in the same arrangement as described in connection with FIG. 4. However, a composite "dry patch"-slurry cathode arrangement is presented as a slurry deposition 74 positioned over a cathode dry patch 76. Manganese dioxide-carbon cathode dry patch 76 is preformed upon polymeric current collector material 54c utilizing an aqueous solution incorporating, for instance, a butyl rubber or the like binder as described in the above-referenced U.S. Pat. No. 3,770,504. Following initial deposition, the aqueous phase of the binder solution is removed by heat induced vaporization. Generally a 25:1 ratio by weight of manganese dioxide to carbon is utilized for such dry patch cathode structures where an acetylene black-type carbon is provided. Cathode slurry 74 is formed in similar fashion as described in conjunction with FIGS. 2 and 3.

Figure 6:
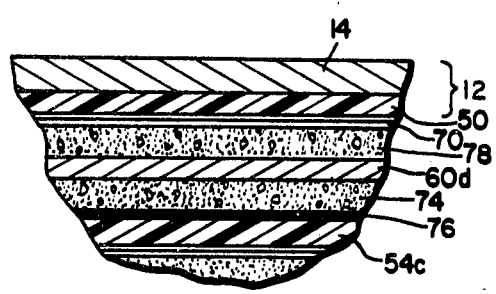

Looking at FIG. 6, another embodiment of the invention is revealed. As is apparent from the figure, this structure utilizes dry patch electrode structures 70 and 76 for initial anode and cathode coverings, respectively, of polymeric current collectors 50 and 54c. Additionally, the cell incorporates anode and cathode slurry components shown, respectively, at 78 and 74 in complement with the dry patch predepositions. Such multiple component structures may be found useful for applications requiring higher battery capacities.

Figure 7:
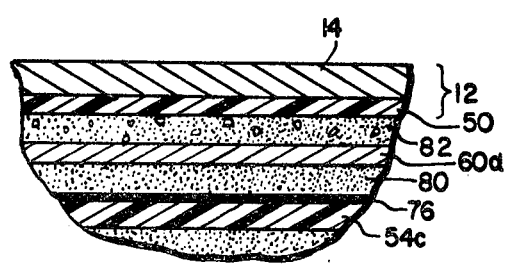

Referring to FIG. 7, still another embodiment of the invention is illustrated. Here, a conventional dry patch cathode structure 76 is utilized in conjunction with a conventional, nonslurry, gel electrolyte shown at 80. This electrolyte may have the composition described above. The anode component of the cell is formed incorporating only a slurry composition 82 identical to that described in conjunction with FIGS. 2 and 3.

Figure 8:
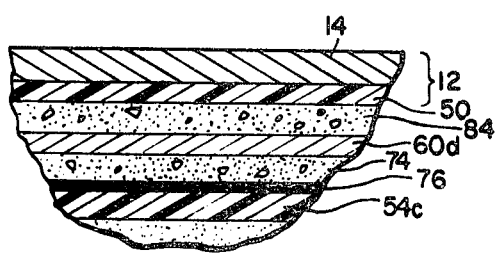

Looking to FIG. 8, a final embodiment for a cell structure according to the invention is shown. Note in the figure, that the cathode structure of the cell includes a slurry component 74 operating in conjunction with a dry patch cathode 76. The anode for the composite cell is formed purely as an anode slurry material 84. As in the case of the earlier embodiments, all slurries are configured as hereinabove described.

As noted above, batteries constructed in accordance with the invention are characterized in exhibiting improved current drain capacities. One technique for evaluating the effectiveness of the flat battery structures for the noted photographic application is to test certain batteries or unit cells selected from manufactured lots thereof by pulsing them repeatedly through a predetermined load for a given pulse interval and providing a predetermined rest period intermediate the pulses. The instant battery system may be evaluated under such a testing technique by forming unit cells, for instance, according to the embodiment wherein one select electrode thereof is formed as a slurry system, while the oppositely disposed electrode is formed under more conventional "dry patch" technique as is generally described, for instance, in U.S. Pat. No. 3,770,504. Such dry patch electrodes generally are formed, as noted above, in the case of the anode electrode by predepositing anode material in the form of powdered zinc within an aqueous binder solution which, subsequent to deposition, is removed by heat induced vaporization or the like. Also as above described, the manganese dioxide-carbon cathode dry patch may be formed upon a current collector material utilizing an aqueous solution incorporating a butyl rubber or the like as a binder. To form one side of a cell, the preformed electrodes are wetted by a conventional gelled electrolyte as described in connection with FIG. 4.

The improved current capacity of flat Le Clanche cells fabricated utilizing a slurry system of the invention as compared with the noted purely dry patch cell may be demonstrated by the following comparative data. Battery cells were fabricated utilizing collector assemblies, separators and seals substantially as described in connection with FIGS. 1, 2, and 3, however, only single cell units utilizing two collector assemblies were formed. These cells were provided having electrochemically active dimensions, i.e., current collector, of about 3 inches long and 2½ inches wide. Testing was carried out by pulsing the cells as above described through a 3.3 ohm load for 1.1 seconds and utilizing a 3-second rest interval intermediate each pulse. Purely dry-patch type control cells remained active from between 81 and 115 pulses before breakdown. By comparison, single cells having the equivalent amount of electrode material as the control cells but having cathode electrodes formed as a slurry and anode electrodes in dry patch conventional form (FIG. 4) were prepared. While the amount of material in the electrodes remained substantially the same as the control, the manganese dioxide-carbon ratio within the cathode electrode was altered from 25:1 to 8:1. The aqueous slurry cathodes were prepared from the following type formulation:

| | |
|---|---|
| ammonium chloride | 33 gm. |
| zinc chloride | 15 gm. |
| mercuric chloride | 3 gm. |
| 10% solution of Poly(2-Acrylamido-2-Methylpropanesulfonic Acid) | 60 gm. |
| carbon black | 25 gm. |
| manganese dioxide | 200 gm. |
| water | 45 ml. |

When pulsed as above described, the cells exhibited a pulse capacity ranging from 280 to 294 pulses.

As described in copending application for U.S. Pat. Ser. No. 411,254, by Edwin H. Land, filed Oct. 31, 1973, entitled: Electronic Photographic System, and assigned in common herewith, flat thin laminar batteries may be uniquely suited to provide the rapid recharge capability required by an electronic flash unit. This results from the high current drain capability resulting from the relatively large area of the individual cells of the battery relative to the weight and volume thereof. For operating an automatic camera incorporating a complex photographic cycle as described in the above mentioned U.S. Pat. No. 3,774,516 in conjunction with an electronic flash, the necessary energy requirements of the battery may be specified, for instance, in watt seconds. While such current drain capabilities might be achieved using a variety of battery structures, for practical photographic purposes it is necessary that rapid recycling occur between operation of the flash unit. Recycling time, for the most part, depends upon the speed which the capacitor within the electronic flash unit can be recharged, which is determined by the amount of current that can be taken from the battery without damage thereto. Accordingly, a test was devised wherein a Polaroid SX-70 camera, as above mentioned, was provided with an electronic flash unit and actuated to carry out a flash illuminational photographic cycle following flash unit capacitor chargeup and following a 30 second battery rest interval. Nominally, the photographic apparatus required 106 watt seconds for each such actuation. The following tabulation shows the initial and recharge interval required for the electronic flash unit in the test above described for four cell battery units utilizing dry patch anode and slurry cathode electrodes formed in accordance with the invention; and utilizing the conventional dry patch anode and cathode structure as above described. The slurry formulations were substantially similar to those described above. This data reveals that the slurry-type electrode cell arrangement of the invention provides for improved recycling rates, current and energy capacities.

| | Flash Unit Charge Intervals-Seconds | |
|---|---|---|
| Photog. Cycle | Dry Patch Structure Cathode and Anode | Dry Patch Anode Structure Slurry cathode structure |
| 1. | 6.2 | 4.4 |
| 2. | 7.6 | 5.0 |
| 3. | 9.4 | 5.2 |
| 4. | 11.6 | 5.6 |
| 5. | 14.0 | 6.2 |
| 6. | 16.8 | 6.4 |
| 7. | 21.2 | 7.0 |
| 8. | 29.4 | 7.4 |
| 9. | 53.6 | 8.0 |
| 10. | battery | 8.4 |
| | Flash Unit Charge Intervals-Seconds | |
| Photog. Cycle | Dry Patch Structure Cathode and Anode | Dry Patch Anode Structure Slurry cathode structure |
| | failure | |

While it is preferred to employ the aforementioned Le Clanche electrochemical system (comprising manganese dioxide positive active material, zinc negative active material, and an electrolyte comprising ammonium chloride and zinc chloride), the battery may employ a wide variety of positive and negative electrode materials and a wide variety of electrochemical systems. For instance, an alkaline system or the like may be provided.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. In a battery of a variety having a positive electrode, a negative electrode and an ion permeable separator located between said electrodes, the improvement wherein one said electrode comprises a dispersion of particulate active electrode material dispersed in fluid electrolyte and poly(2-acrylamido-2-methylpropanesulfonic acid).

2. The improved battery of claim 1 wherein said active electrode material includes manganese dioxide and carbon.

3. The improved battery of claim 2 wherein said electrolyte includes ammonium chloride and zinc chloride.

* * * * *